(12) United States Patent
Zhao et al.

(10) Patent No.: US 7,549,876 B2
(45) Date of Patent: Jun. 23, 2009

(54) ELECTRICAL CARD CONNECTOR HAVING AN INSULATIVE HOUSING INTEGRALLY MOLDED WITH A SHELL

(75) Inventors: Qi-Jun Zhao, Kunshan (CN); Li Li, Kunshan (CN); Hua Yin, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/229,349

(22) Filed: Aug. 21, 2008

(65) Prior Publication Data

US 2009/0053918 A1 Feb. 26, 2009

(30) Foreign Application Priority Data

Aug. 21, 2007 (CN) .................... 2007 2 0045421 U

(51) Int. Cl.
*H01R 13/62* (2006.01)
(52) U.S. Cl. ..................... 439/159; 439/157; 439/188
(58) Field of Classification Search ................ 439/159, 439/157, 188, 607
See application file for complete search history.

(56) References Cited

U.S. PATENT DOCUMENTS

| 6,520,783 B2 | 2/2003 | Hsu | |
|---|---|---|---|
| 7,357,674 B2 | 4/2008 | Anzai et al. | |
| 2006/0166532 A1* | 7/2006 | Tsai | 439/159 |
| 2006/0183361 A1* | 8/2006 | Kan | 439/159 |
| 2007/0037425 A1* | 2/2007 | Miyamoto | 439/159 |
| 2007/0149017 A1* | 6/2007 | Hsu et al. | 439/159 |
| 2008/0050937 A1* | 2/2008 | Miyao et al. | 439/64 |

* cited by examiner

*Primary Examiner*—Hien Vu
(74) *Attorney, Agent, or Firm*—Wei Te Chung

(57) ABSTRACT

An electrical card connector (100) for insertion of an electrical card (200) comprises an insulative housing (1), a plurality of terminals (2) coupled to the insulative housing and a first shell (4). The insulative housing comprises a base portion (11), an arm portion (12) extending from a lateral side of the base portion, and a receiving space (13) formed between the base portion and the arm portion to receive the electrical card. The terminals are coupled to the base portion and extend into the receiving space for electrical connection to the electrical card. The first shell (4) is integrally molded with the insulative housing (1) and covers the insulative housing.

11 Claims, 5 Drawing Sheets

ELECTRICAL CARD CONNECTOR HAVING AN INSULATIVE HOUSING INTEGRALLY MOLDED WITH A SHELL

BACKGROUND OF THE INVENTION

1. Field of the invention

The present invention generally relates to an electrical card connector for receiving an electrical card and more particularly to an electrical card connector having an insulative housing integrally molded with a shell.

2. Description of Related Art

With constant development of communications and computer technology, more and more electrical cards are being designed to meet various requirements. Electrical card connectors are used to connect these electrical cards with corresponding mainframes. A conventional electrical card connector usually comprises an insulative housing, a plurality of terminals coupled thereto, a first shell and a second shell enveloping the insulative housing to prevent Electro-Magnetic Interference (EMI). The first shell and the second shell both are assembled to the insulative housing.

However, the first shell and the second shell are easily deformed when they are being assembled to the insulative housing. Furthermore, the insulative housing is easily loose from the first and second shell with multiple insertion and ejection of the electrical card.

Hence, an improvement over the prior art is required to overcome the problems thereof.

SUMMARY OF THE INVENTION

According one aspect of the present invention, an electrical card connector for insertion of an electrical card comprises an insulative housing, a plurality of terminals coupled to the insulative housing and a first shell. The insulaitve housing comprises a base portion, an arm portion extending from a lateral side of the base portion, and a receiving space formed between the base portion and the arm portion to receive the electrical card. The terminals are coupled to the base portion and extend into the receiving space for electrical connection to the electrical card. The first shell is integrally molded with the insulative housing and covers the insulative housing.

According to another aspect of the present invention, An electrical card connector for insertion of an electrical card comprises a plurality of terminals, an insulative housing supporting the terminals, a first shell and a second shell. Each terminal comprises a contacting portion for electrical connection to the electrical card, a tail portion for electrical connection to a printed circuit board, and a connecting portion for connecting the contacting portion and the tail portion. The insulative housing has a base portion for retaining the connecting portions of the terminals and a receiving space for receiving the electrical card. The first and second shell envelope the insulative housing. Said first shell is integrally molded with the insulative housing.

These and additional objects, features, and advantages of the present invention will become apparent after reading the following detailed description of the preferred embodiment of the invention taken in conjunction with the appended drawings.

DETAILED DESCRIPTION OF THE INVENTION

Figure 1:
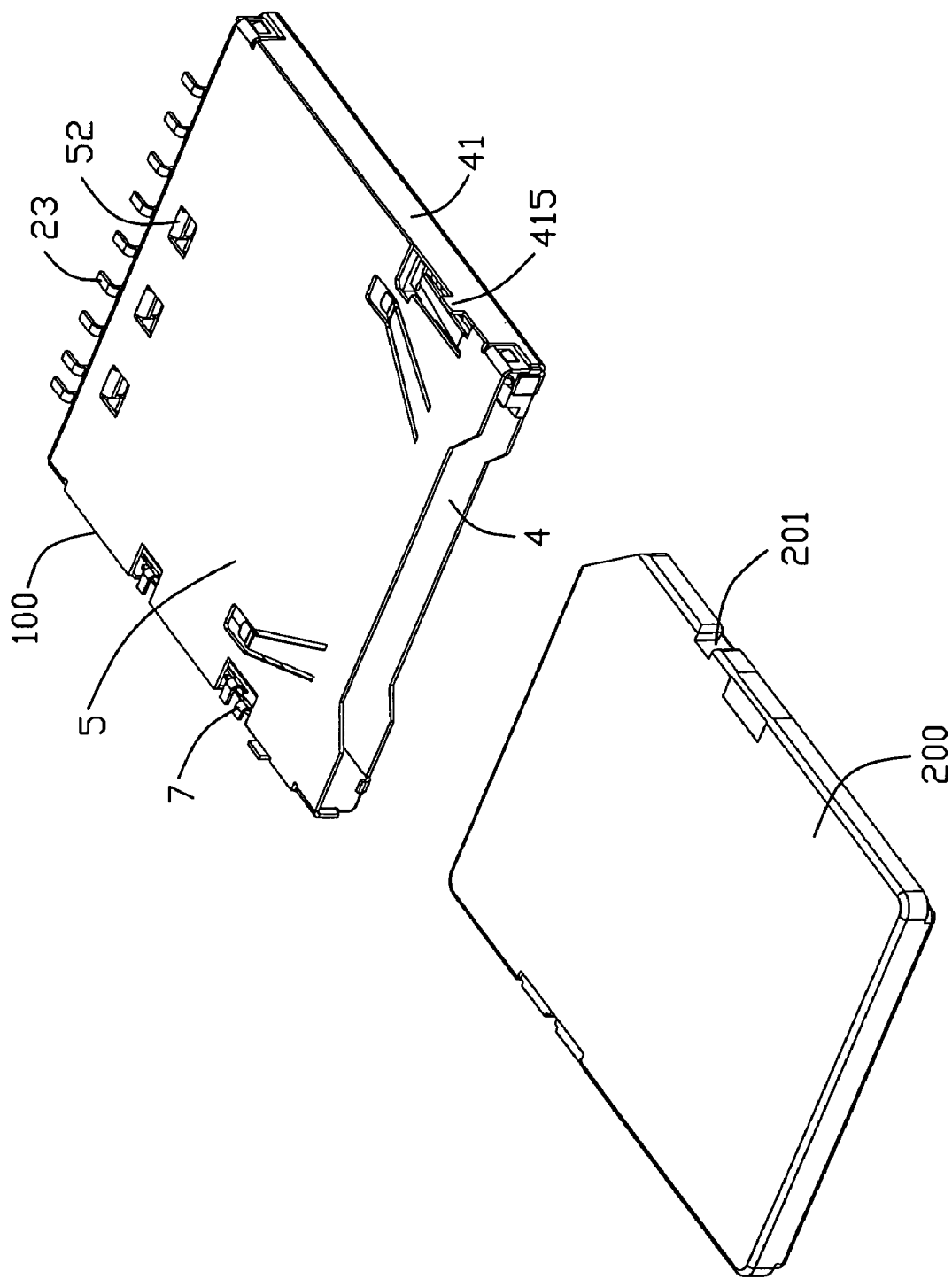
FIG. 1 is a perspective view of an electrical card connector with an electrical card to be received therein according to the present invention.

Reference will now be made to the drawing figures to describe the preferred embodiment of the present invention in detail.

Figure 3:
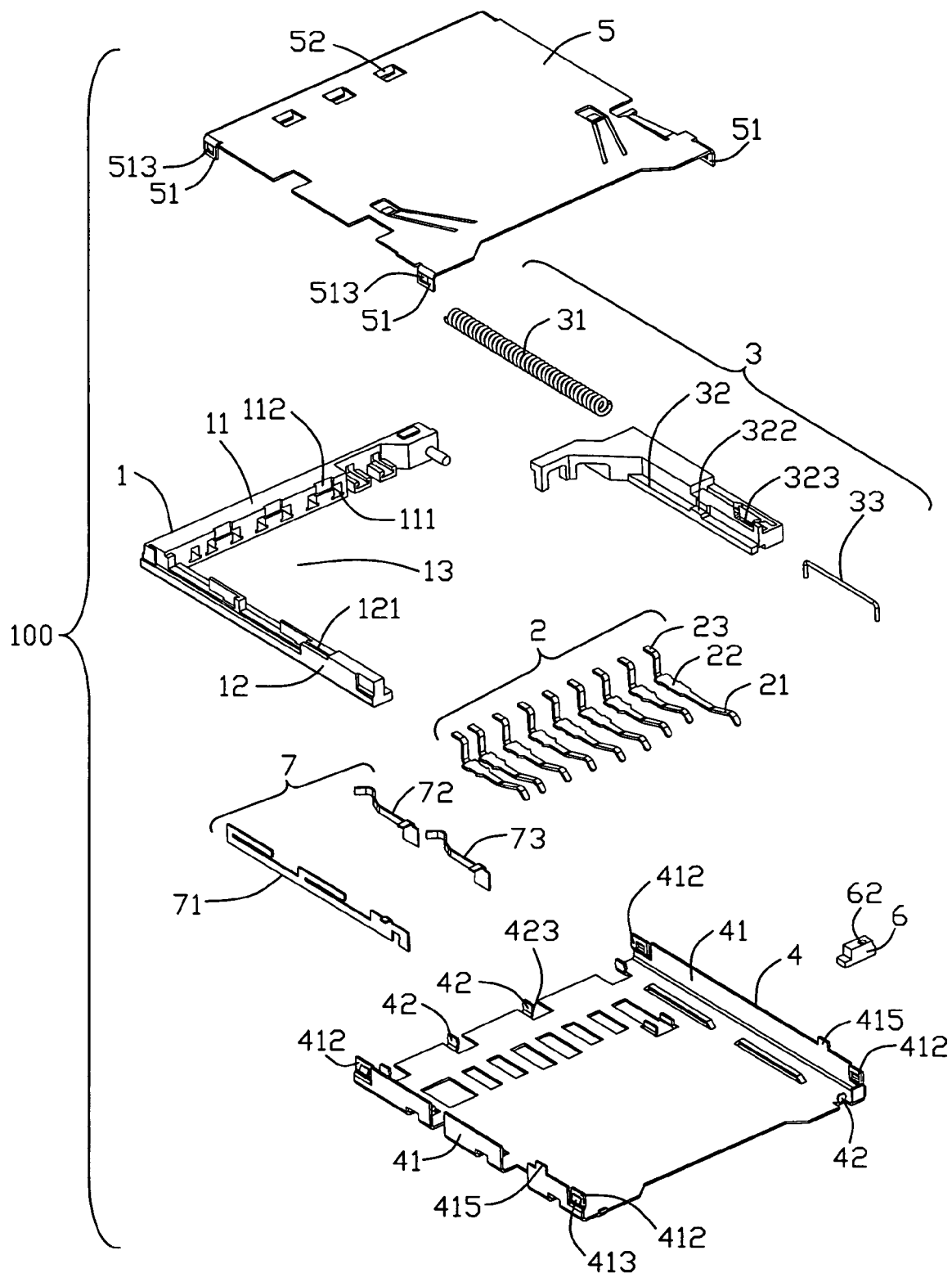
FIG. 3 is an exploded view of the electrical card connector shown in FIG 1.

Referring to FIGS. 1 and 3, an electrical card connector 100 for insertion of an electrical card 200 according to the present invention, comprises an insulative housing 1, a plurality of terminals 2 coupled to the insulative housing 1, an ejecting mechanism 3, a block 6, a plurality of detecting terminals 7 coupled to the insulative housing 1, a first and second shell 4, 5 enveloping the insulative housing 1.

Figure 4:
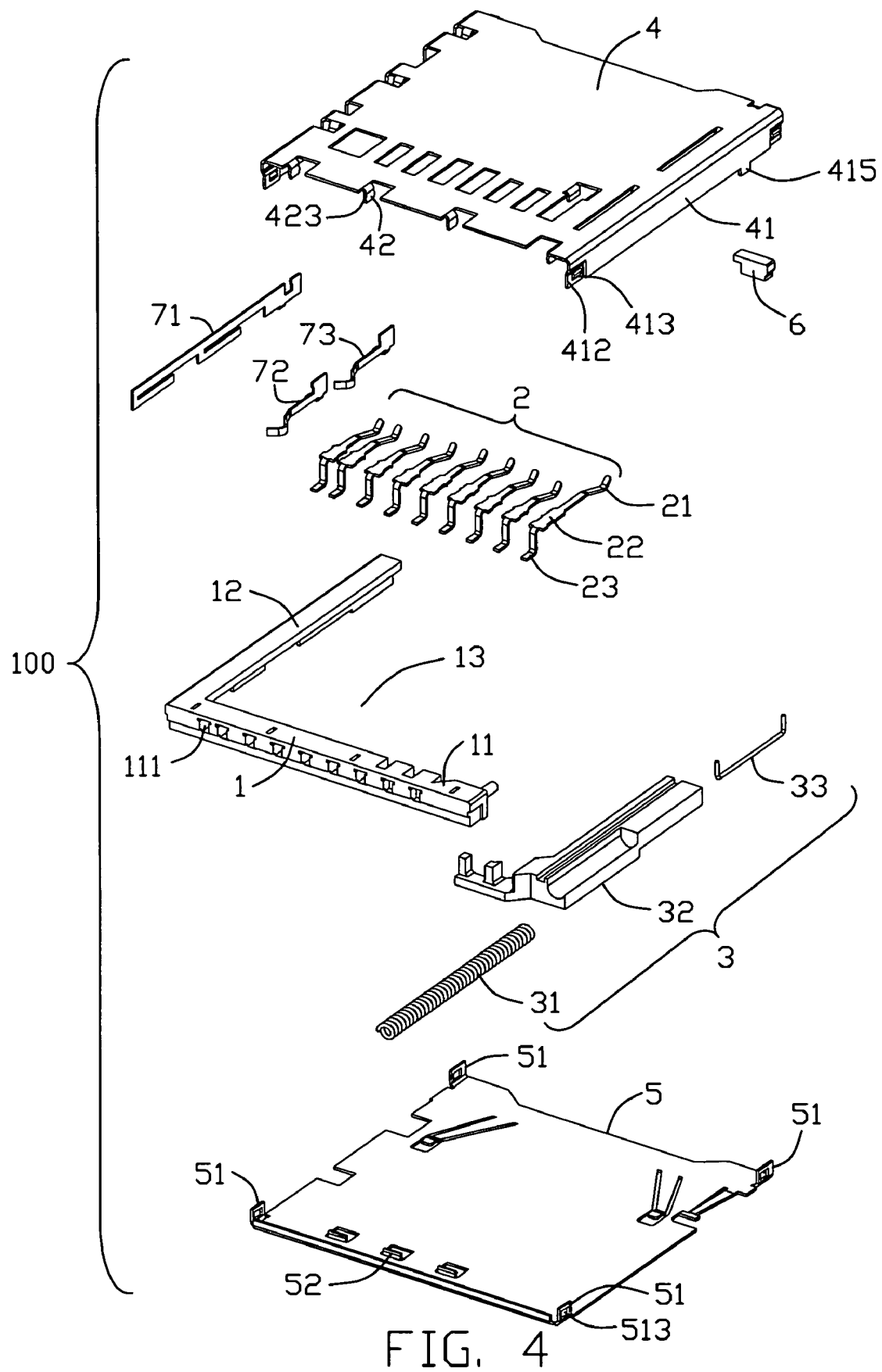
FIG. 4 is an another exploded view of the electrical card connector shown in FIG. 1.

Referring to FIGS. 3 and 4, the insulative housing 1 comprises a base portion 11, an arm potion 12 integrally extending from a lateral side of the base portion 11, and a receiving space 13 formed between the base portion 11 and the arm portion 12. The base portion 11 has a plurality of passageways 111 passing therethrough and a plurality of slots 112 in the front of the base portion 11. The arm portion 12 has a plurality of cavities 121 for receiving the detecting terminals 7. It is also easy to be understood that, in an alternative embodiment, the arm portion 12 and the base portion 11 may be formed individually, and the arm portion 12 is assembled to the base portion 11.

Figure 5:
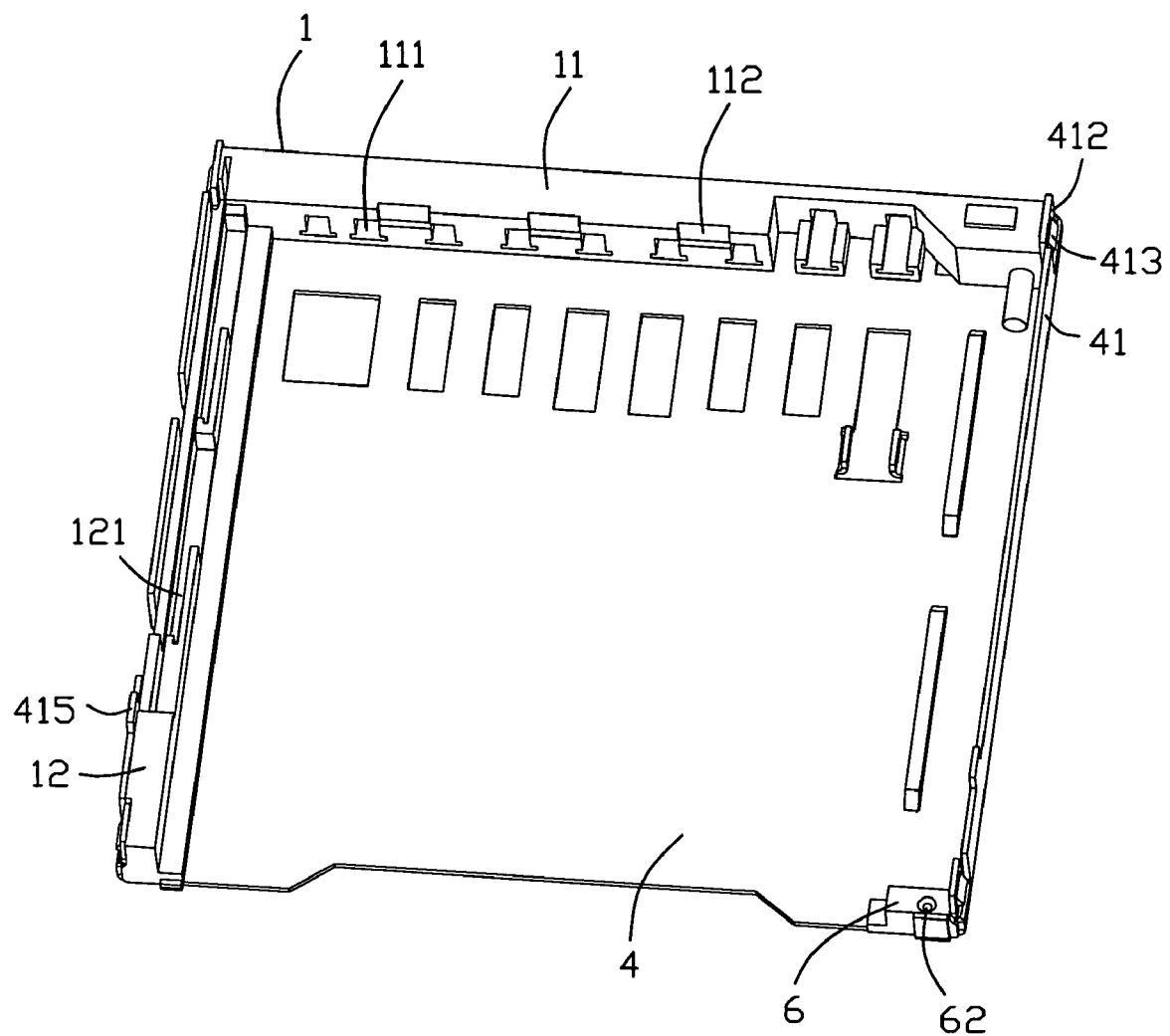
FIG. 5 is a perspective view of a first shell integrally molded with both an insulative housing and a block shown in FIG. 1.

Referring to FIGS. 3-5, the first shell 4 is integrally molded with the insulative housing 1 and the block 6. Therefore, the first shell 4, the insulative housing 1 and the block 6 which are molded in a die could simplify manufacturing procedures of the electrical card connector 100. Furthermore, the insulative housing 1 and the block 6 could combine with the first shell 4 reliably. The first shell 4 has a pair of side walls 41 extending upwardly from two opposite sides thereof and a plurality of tabs 42 extending upwardly therefrom. Each side wall 41 has a plurality of first plates 412 each defining a latching tab 413 and a leg 415 extending upwardly from the side wall 41 so as to be fixed to a printed circuit board (not shown). The tabs 42 extend into the insulative housing 1 and the block 6. Each tab 42 has a plurality of protrusions 423 protruding therefrom, thus the first shell 4 can combine with the insulative housing 1 and the block 6 more reliably. The block 6 is present as a ladder shape and has an aperture 62.

Each terminal 2 has a contacting portion 21 for electrical connection to the electrical card 200, a tail portion 23 for electrical connection to the printed circuit board, and a connecting portion 22 connecting the contacting portion 21 and the tail portion 23. The connecting portion 22 is received in the passageways 111 so as to be fixed in the base portion 11.

Figure 2:
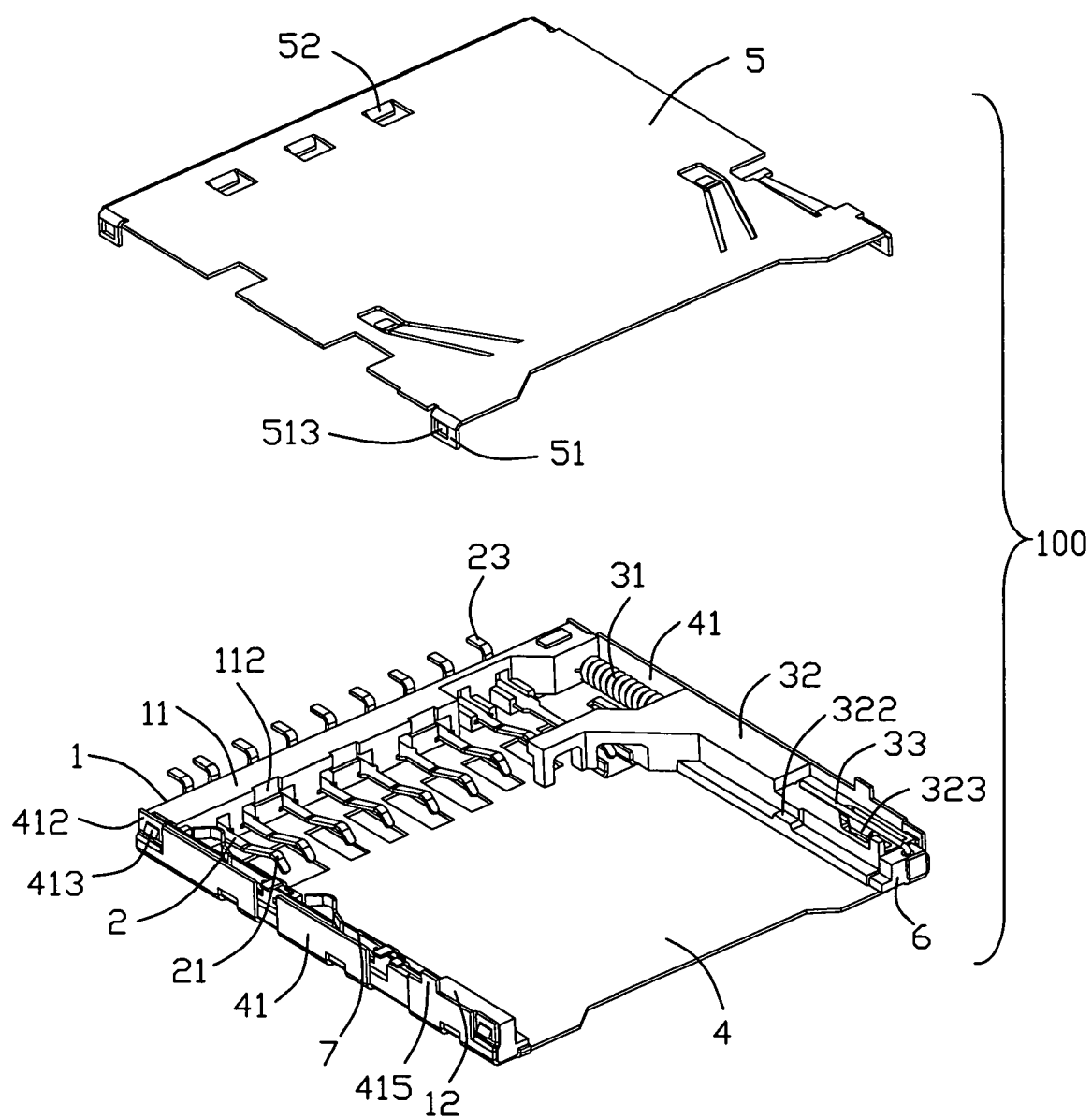
FIG. 2 is a partly exploded view of the electrical card connector shown in FIG. 1.

Referring to FIGS. 2-4, the ejecting mechanism 3 is located on a right side of the insulative housing 1 and comprises a slider 32 movable between the base portion 11 and the block 6 in the electrical card 200 insertion/extraction direction, a spring 31 sandwiched between the base portion 11 and the slider 32, and a connecting rod 33. The slider 32 has a heart-shaped cam groove 323 and a projection 322 for locking into a notch 201 of the electrical card 200. The connecting rod 33 has a front-end bent portion retained into the aperture 62 of the block 6 and a rear-end bent portion slidably fitted into the cam groove 323. Therefore, the slider 32 is able to move backwardly or forwardly with an insertion or ejection of the electrical card 200 under a control of the connecting rod 33.

Referring to FIGS. 3-4, the detecting terminals 7 are received in the cavities 121 of the arm portion 12 and comprise a first terminal 71, a second terminal 72 and a third terminal 73. The second terminal 72 and the third terminal 73 are brought into or out of contacting with the first terminals 71 with insertion or ejection of the electrical card 200. Therefore, the detecting terminals 7 are able to detect the insertion of the electrical card 200.

The second shell 5 has a plurality of second plates 51 extending downwardly therefrom and each having a hole 513 engaging with the corresponding latching tab 413 so as to combine with the first shell 4 reliably. The second shell 5 has a plurality of blocking tabs 52 engaging with the slots 112 of the base portion 11 so as to be assembled to the insulative housing 1 firmly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector for insertion of an electrical card, comprising:
    an L-shape insulative housing comprising a base portion, an arm portion extending from a lateral side of the base portion, and a receiving space formed between the base portion and the arm portion to receive the electrical card;
    a plurality of terminals coupled to the base portion and extending into the receiving space for electrical connection to the electrical card; and
    a first shell being integrally molded with the insulative housing and covering the insulative housing;
    wherein the electrical card connector further comprises a second shell covering the insulative housing, the first shell has a pair of side walls extending from two opposite sides thereof, each side wall has a plurality of first plates extending therefrom and each defining a latching tab, the second shell has a plurality of second plates extending therefrom and each defining a hole to engage with the corresponding latching tab;
    wherein the electrical card connector has an ejecting mechanism comprising a movable slider, a connecting rod and a spring sandwiched between the slider and the base portion, the slider has a heart-shaped cam groove and a projection for locking into a notch of the electrical card, the connecting rod has an one-end bent portion slidably fitted into the cam groove;
    wherein the electrical card connector has a block coupled to the first shell and located in front of the slider, the block defines an aperture, the connecting rod has an other end bent portion retained in the aperture;
    wherein the block is integrally molded with the first shell; and
    wherein the first shell has a tab extending into the block and defining a plurality of protrusions protruding from the tab.

2. The electrical card connector as claimed in claim 1, wherein the first shell has a plurality of tabs extending into the insulative housing.

3. The electrical card connector as claimed in claim 2, wherein each tab has a plurality of protrusions protruding therefrom.

4. The electrical card connector as claimed in claim 1, wherein the base portion has a plurality of slots, the second shell has a plurality of blocking tabs to engage with the slots.

5. The electrical card connector as claimed in claim 1, wherein the electrical card connector has a plurality of detecting terminals coupled to the arm portion.

6. An electrical card connector for insertion of an electrical card, comprising:
    a plurality of terminals each comprising a contacting portion for electrical connection to the electrical card, a tail portion for electrical connection to a printed circuit board, and a connecting portion for connecting the contacting portion and the tail portion;
    an L-shape insulative housing having a base portion for retaining the connecting portion and a receiving space for receiving the electrical card; and
    a first and a second shell enveloping the insulative housing; wherein
    said first shell is integrally molded with the insulative housing;
    wherein the electrical card connector has an ejecting mechanism comprising a movable slider, a connecting rod and a spring sandwiched between the slider and the base portion, the slider has a heart-shaped cam groove, the connecting rod has a rear-end bent portion slidably fitted into the cam groove;
    wherein the electrical card connector has a block integrally molded with the first shell and located in front of the slider, the block defines an aperture, the connecting rod has a front end bent portion received in the aperture;
    wherein the first shell has a pair of side walls extending from two opposite sides thereof, each side wall has a first plate extending therefrom and defining a latching tab, the second shell has a second plate extending therefrom and defining a hole to engage with the corresponding latching tab; and
    wherein the first shell has a tab extending into the block and defining a plurality of protrusions protruding from the tab.

7. The electrical card connector as claimed in claim 6, wherein the first shell has a plurality of tabs extending into the insulative housing and each defining a plurality of protrusions extending therefrom.

8. The electrical card connector as claimed in claim 6, wherein the base portion of the insulative housing has a plurality of slots in a front end thereof, the second shell has a plurality of blocking tabs extending therefrom and engaging with the slots.

9. An electrical connector comprising:
    an L-shaped insulative housing;
    upper and bottom rectangular shells commonly sandwiching said housing therebetween and cooperating with said housing to form a rectangular card receiving cavity thereabouts under a condition that said rectangular card receiving cavity defines opposite front and rear sides and two opposite lateral sides between said opposite front and rear sides in a front-to-back direction wherein said housing is located at only the rear side and one of said lateral sides;
    said upper shell and said bottom shell fastened to each other, and at least one of said upper shell and said bottom shell fastened to the housing so as to have said housing and said upper shell and said bottom shell fastened together as one piece;

a plurality of contacts disposed in the housing with a plurality of contacting sections extending into the card receiving cavity;

an ejecting mechanism located at the other of said lateral sides and moveable relative to the combined housing, upper shell and bottom shell under a condition that opposite upper and bottom faces of a slider of the ejecting mechanism are respectively engaged with the upper shell and the bottom shell;

wherein the electrical connector further including an insulative block fastened to a front edge region of said at least one of the upper shell and the bottom shell and cooperating with the housing to define therebetween in said front-to-back direction a space in which said ejecting mechanism slides;

wherein the ejecting mechanism comprising a movable slider, a connecting rod and a spring sandwiched between the slider and the base portion, the slider has a heart-shaped cam groove and a projection for locking into a notch of the electrical card, the connecting rod has an one-end bent portion slidably fitted into the cam groove;

wherein the block defines an aperture, the connecting rod has an other end bent portion retained in the aperture.

10. The electrical connector as claimed in claim 9, further including guiding devices formed on both the housing and at least one of said upper shells and said bottom shells to guide the ejecting mechanism to move along the front-to-back direction.

11. The electrical connector as claimed in claim 9, wherein said at least one of the upper shell and the bottom shell is fastened to the housing via an insert molding procedure.

* * * * *